(12) United States Patent
Donley et al.

(10) Patent No.: US 7,717,497 B2
(45) Date of Patent: May 18, 2010

(54) INTAKE HEATER FOR HVAC FRESH AIR INTAKE

(75) Inventors: Harl Donley, Woodburn, IN (US); Diane K. Bollinger, Columbia City, IN (US); Kevin D. Campbell, Granville, OH (US); Joaquin J. Hernandez, Fort Wayne, IN (US); Lenora G. Hazen, Fort Wayne, IN (US)

(73) Assignee: International Truck Intellectual Property Company, LLC, Warrenville, IL (US)

( * ) Notice: Subject to any disclaimer, the term of this patent is extended or adjusted under 35 U.S.C. 154(b) by 401 days.

(21) Appl. No.: 11/428,666

(22) Filed: Jul. 5, 2006

(65) Prior Publication Data

US 2008/0007092 A1    Jan. 10, 2008

(51) Int. Cl.
*B62D 25/08* (2006.01)
(52) U.S. Cl. ...................................... 296/192
(58) Field of Classification Search ............ 296/187.01, 296/190.09, 192
See application file for complete search history.

(56) References Cited

U.S. PATENT DOCUMENTS

| | | | | | |
|---|---|---|---|---|---|
| 2,045,044 | A | * | 6/1936 | Modine | 237/12.3 B |
| 2,146,845 | A | * | 2/1939 | Payne | 454/75 |
| 2,185,486 | A | * | 1/1940 | Wahlberg | 454/139 |
| 2,192,657 | A | * | 3/1940 | Werther | 454/127 |
| 2,198,156 | A | * | 4/1940 | Findley | 454/148 |
| 2,213,018 | A | * | 8/1940 | Perkins | 237/8 A |
| 2,257,638 | A | * | 9/1941 | Moore | 237/34 |
| 2,316,421 | A | * | 4/1943 | Hans | 454/148 |
| 2,355,151 | A | * | 8/1944 | Findley | 454/121 |
| 2,355,501 | A | * | 8/1944 | Arnold | 454/148 |
| 2,463,908 | A | * | 3/1949 | Rose | 237/8 A |
| 2,510,790 | A | * | 6/1950 | Arnold | 454/126 |
| 3,008,400 | A | * | 11/1961 | Barenyi | 454/147 |
| 3,084,866 | A | * | 4/1963 | Keightley | 237/12.3 R |
| 6,021,843 | A | | 2/2000 | Roach | |
| 6,868,928 | B2 | | 3/2005 | Cohen et al. | |
| 2004/0134995 | A1 | | 7/2004 | Keeler | |

FOREIGN PATENT DOCUMENTS

| | | | |
|---|---|---|---|
| DE | 03923687 A1 | 1/1991 | |
| DE | 19857081 A1 | 6/2000 | |
| EP | 0288770 A | 11/1988 | |
| EP | 1120300 A2 | * 8/2001 | |
| FR | 02569379 A1 | 2/1986 | |
| JP | 61169313 A | 7/1986 | |
| KR | 20020026735 A | 4/2002 | |

* cited by examiner

*Primary Examiner*—H Gutman
(74) *Attorney, Agent, or Firm*—Jeffrey P. Calfa; Mark C. Bach; Gerald W. Askew

(57) ABSTRACT

A vehicle having a cowl tray and a Heating, Ventilation, and Air Conditioning (HVAC) system is provided with one or more coolant-to-air heat exchangers near the intake opening of the HVAC system or attached to the cowl tray, in order to prevent an accumulation of snow and ice from blocking the flow of intake air into the HVAC system and interfering with the windshield wiper system. The accumulation of snow and ice in the HVAC intake is a problem commonly experienced by vehicles having the HVAC intake located near the base of the vehicle windshield, due to turbulent precipitation.

4 Claims, 11 Drawing Sheets

PARTIAL VIEW OF VEHICLE
HAVING COWL TRAY
WITH HVAC INTAKE

VEHICLE HAVING REGION OF RECIRCULATION NEAR BASE OF WINDSHIELD

PARTIAL VIEW OF VEHICLE
HAVING COWL TRAY
WITH HVAC INTAKE

VEHICLE WITH SNOW AND ICE ACCUMULATION AT BASE OF WINDSHIELD DUE TO TURBULENT PRECIPITATION

VEHICLE HAVING TUBE AND FIN
TYPE HEAT EXCHANGER WITHIN
THE HVAC INTAKE

VEHICLE HAVING RADIANT HEAT
EXCHANGER WITHIN THE HVAC INTAKE

VEHICLE HAVING HEAT EXCHANGER
WITHIN HVAC INTAKE, WITH HEAT
CONDUCTIVE STRUCTURE

HVAC INTAKE HEATER AND PRIMARY
HEATER CORE PLUMBED IN
SERIES CONFIGURATION

HVAC INTAKE HEATER AND PRIMARY
HEATER CORE PLUMBED IN PARALLEL
CONFIGURATION

HVAC INTAKE HEATER USING
A REMOTELY-CONTROLLED VALVE

HVAC INTAKE HEATER USING
AUTOMATICALLY CONTROLLED VALVE
AND SNOW, ICE, AND AMBIENT
CONDITIONS SENSORS

VEHICLE HAVING COOLANT-TO-AIR HEAT EXCHANGERS
WITHIN THE HVAC INTAKE AND ATTACHED TO
THE COWL TRAY

INTAKE HEATER FOR HVAC FRESH AIR INTAKE

BACKGROUND OF THE INVENTION

1. Field of the Invention

This invention relates to the use of one or more coolant-to-air heat exchangers in conjunction with a cowl tray and a Heating, Ventilation, and Air Conditioning (HVAC) intake. The coolant-to-air heat exchangers are used to prevent accumulation of snow and ice, both within the intake itself, and upon the cowl tray beneath the vehicle windshield wipers. The HVAC intake may be integrated directly into the cowl tray, which cowl tray and intake may be located at the base of the vehicle windshield in a location prone to snow and ice accumulation, due to the action of the vehicle windshield wipers, and due to turbulent precipitation.

2. Description of the Related Art

Ground traveling vehicles having an occupant cabin are almost universally equipped with some form of Heating, Ventilation, and Air Conditioning (HVAC) system. This system functions to draw air from outside the occupant cabin, heat or cool it to a comfortable temperature, and introduce it into the occupant cabin. The air intake for the HVAC system may be placed at any of a number of locations external to the cabin. However, there are several advantages to locating the intake at the base of the vehicle windshield.

As a ground traveling vehicle moves, it displaces air. Relative to the frame of reference of the moving vehicle, the air flows past the vehicle. This airflow is laminar in some locations, turbulent in others, and at various angles oblique to the direction of travel depending on the geometry of the vehicle body, resulting in regions of high and low pressure. One location that exhibits consistently high pressure is at the base of the windshield, where the moving air must make a transition from the angle of the hood to the angle of windshield. This area is characterized by a region of turbulent recirculation, and somewhat elevated static pressure. For this reason, the HVAC air intake is often there located. In the same way, vehicle manufacturers have in the past located the vehicle engine air intake in the same area. Often, this was referred to as cowl induction.

An advantage to locating the HVAC air intake in a region of elevated static pressure is the fact that so doing provides greater airflow through the HVAC system and into the cabin. Even when the HVAC blower is not operating, a system having its air intake so located provides positive pressure within the vehicle cabin, thereby minimizing draft incursions and water seepage through and around the various seals and seams that are characteristic of a vehicle occupant cabin. Locating the HVAC air intake at the base of the windshield has other advantages as well. The airflow at this point is well up and away from the level at which vehicle exhaust is commonly discharged. The intake may be discreetly hidden from view by the vehicle hood. Additionally, the base of the windshield is proximate to the HVAC air distribution plenum, eliminating the need for lengthy ductwork.

There is, however, a disadvantage to having the HVAC air intake located at the base of the vehicle windshield. When moving air enters a region of turbulent recirculation, it tends to precipitate anything held in suspension. In order to deal with this effect, U.S. Pat. No. 6,868,928 teaches the use of a cowl tray, which catches and drains away moisture, although in the case of the invention taught in U.S. Pat. No. 6,868,928, the region of elevated static pressure is being utilized in an engine cowl induction system. Although the cowl tray taught in U.S. Pat. No. 6,868,928 deals well with liquid water precipitate, snow and ice accumulation at the base of the vehicle windshield continues to be a problem. The snow and ice often packs the cowl tray full, so that the windshield wipers cannot freely complete their range of motion. Snow and ice also tends to enter the HVAC intake, restricting airflow.

The situation of snow and ice entering the HVAC air intake is exacerbated by the fact that the opening of the HVAC air intake is relatively large and oriented vertically, in order to facilitate ease of routing and maximize airflow. Usually, some sort of intake screen is provided, in order to prevent leaves and other large debris from entering the HVAC system. This screen tends to be the point at which snow and ice accumulates. Further, the windshield wipers tend to push at least some snow into the area of recirculation and even directly into the HVAC air intake itself. Under certain conditions, sufficient snow and ice may accumulate to completely block the intake, reducing the amount of airflow available for heating and defrosting the vehicle windows.

SUMMARY OF THE INVENTION

It is the object of the present invention to eliminate the problem of snow and ice accumulation upon the cowl tray and within the HVAC air intake by providing sufficient heat to melt the snow and ice as it is deposited. In order to accomplish this, one or more small engine coolant-to-air heat exchangers are used. A single heat exchanger may be located within the HVAC air intake, proximate to the opening in the cowl tray or equivalent structure. Alternatively to, or in conjunction with, the single heat exchanger within the HVAC intake, one or more heat exchangers may be attached to the upper surface of the cowl tray, extending along its length beneath the base of the windshield and the windshield wipers. Small diameter hose or tubing is used to supply heated engine coolant to the heat exchanger or heat exchangers, which small diameter hose or tubing may be provided with tube insulation to maximize the temperature of the coolant available to the heat exchanger or heat exchangers. The routing of engine coolant to the engine coolant-to-air heat exchanger or heat exchangers may be in series, in parallel, or completely separate from the heater core of the HVAC system.

In order to regulate the flow of coolant to the heat exchanger or heat exchangers, a valve may be present in the coolant supply hose or tubing. This valve may be accessible only from under the vehicle hood, or it may be remotely operated from within the vehicle cab. Further, it may be operated automatically in conjunction with one or more sensors that determine the presence of snow and ice in the HVAC intake. Alternately, automatic operation of the valve may be based on ambient conditions, rather than direct sensing of snow and ice in the HVAC intake.

The engine coolant-to-air heat exchanger or heat exchangers may be of simple tube-and-fin construction, as such heat exchangers are known in the art. Such small tube-and-fin heat exchangers are commonly utilized as power steering coolers, transmission coolers, and the like. In this embodiment, the heat exchanger or heat exchangers rely upon direct proximity to the location of snow and ice accumulation to cause the snow and ice to melt. Alternately, the engine coolant-to-air heat exchanger or heat exchangers may be constructed to maximize radiant heat emission. This embodiment is designed to overcome the limitations on convective heat transfer to the accumulated snow and ice imposed by the fact that the engine coolant-to-air heat exchanger mounted within the HVAC intake is at least partially downstream from the opening, and the engine coolant-to-air heat exchanger or heat exchangers mounted upon the cowl tray are exposed to rapid air movement. A radiant heat exchanger of this type may be constructed as an array of one or more heat transfer tubes coated with a radiantly emissive coating. Further, the radiant coolant-to-air heat exchanger or heat exchangers may be provided with one or more reflectors, in order to attenuate the radiant heat upon the accumulated snow and ice.

In another embodiment, the engine coolant-to-air heat exchanger or heat exchangers are mounted to a thermally conductive structure or structures which may be incorporated into the HVAC intake, or may be attached to the cowl tray. The thermally conductive structure or structures may be constructed of aluminum or other thermally conductive material, and may extend from the mounting location of the engine coolant-to-air heat exchanger to the point of accumulation of snow and ice. A thermally conductive structure used in conjunction with a engine coolant-to-air heat exchanger located within the HVAC intake opening may be in direct communication with the HVAC intake screen.

As in the prior art, water control and drainage is provided within the HVAC air intake in the form of labyrinthine intake geometry, sharp transitions, weep holes, and duckbills. In this way, the present invention accommodates the runoff from the melting snow and ice.

DESCRIPTION OF THE INVENTION

Figure 1:
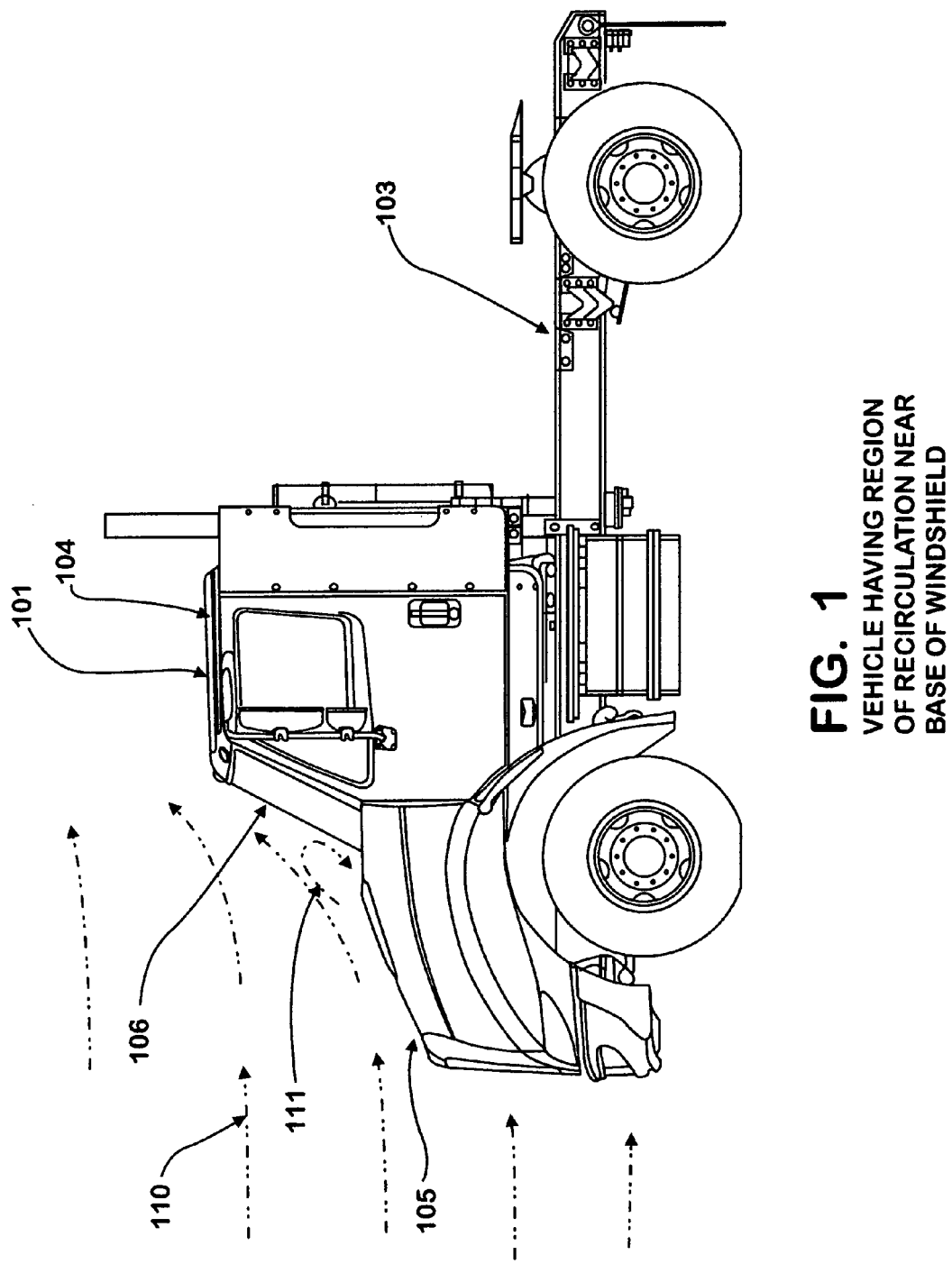
FIG. 1—Vehicle having region of air recirculation and increased static pressure at base of windshield near cowl.

FIG. 1 shows a vehicle 101 having a chassis 103, a cab 104, a windshield 106, and a hood 105. FIG. 1 further shows air flow 110 moving past the vehicle 101. A region of recirculation 111, exhibiting increased static pressure, exists near the base of the windshield 106.

Figure 2:
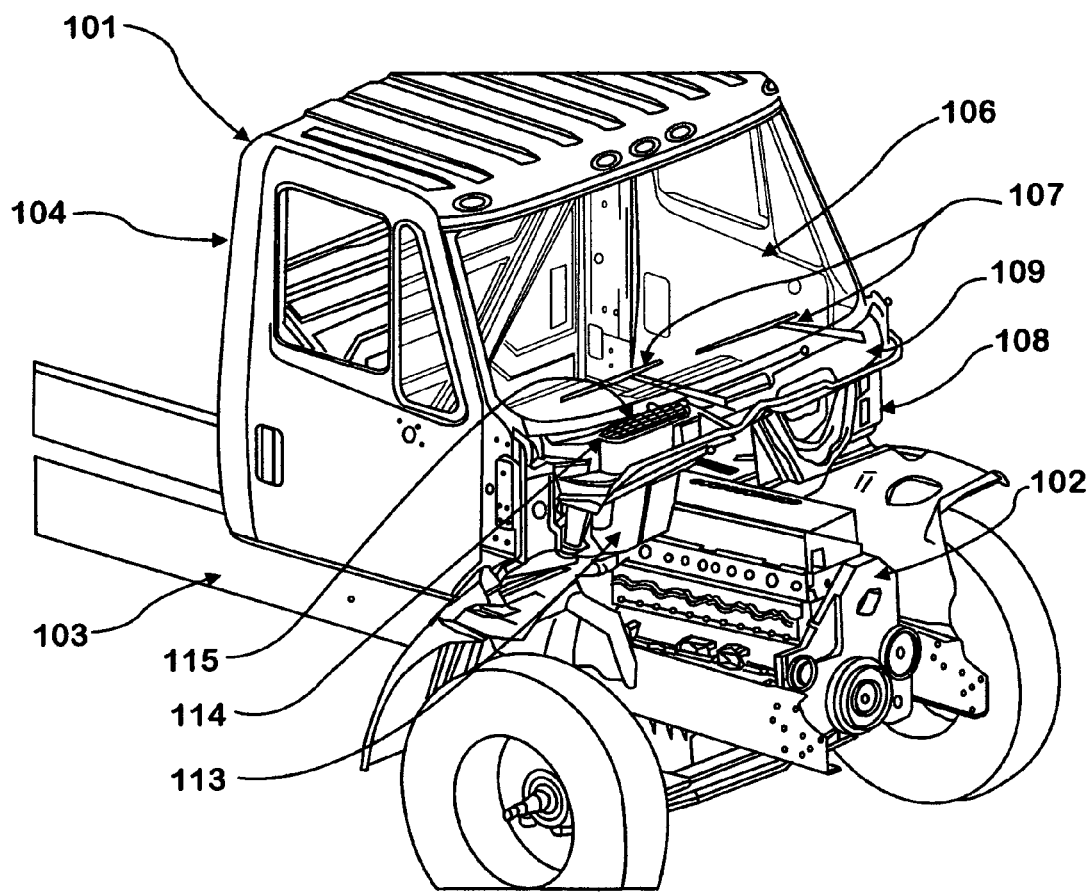
FIG. 2—Partial view of vehicle having HVAC intake located near base of windshield and within cowl tray.

FIG. 2 shows a partial view of a vehicle 101 having an engine 102, a chassis 103, and a cab 104. The hood 105 of vehicle 101 is not shown in FIG. 2. The cab 104 of vehicle 101 has a windshield 106 and windshield wipers 107. Below the windshield 106 and separating occupants of the cab 104 from the engine 105, is a cowl 108. A cowl tray 109 located upon the cowl 108 at the base of the windshield 106 provides drainage of moisture runoff from the windshield 106 and hood 105 (not shown). Connected to the cowl tray 109 is an HVAC system 113, which provides heated or cooled air to the occupants of the cab 104. An HVAC intake opening 114 is integrated into the cowl tray 109, and is provided with an HVAC intake screen 115.

Figure 3:
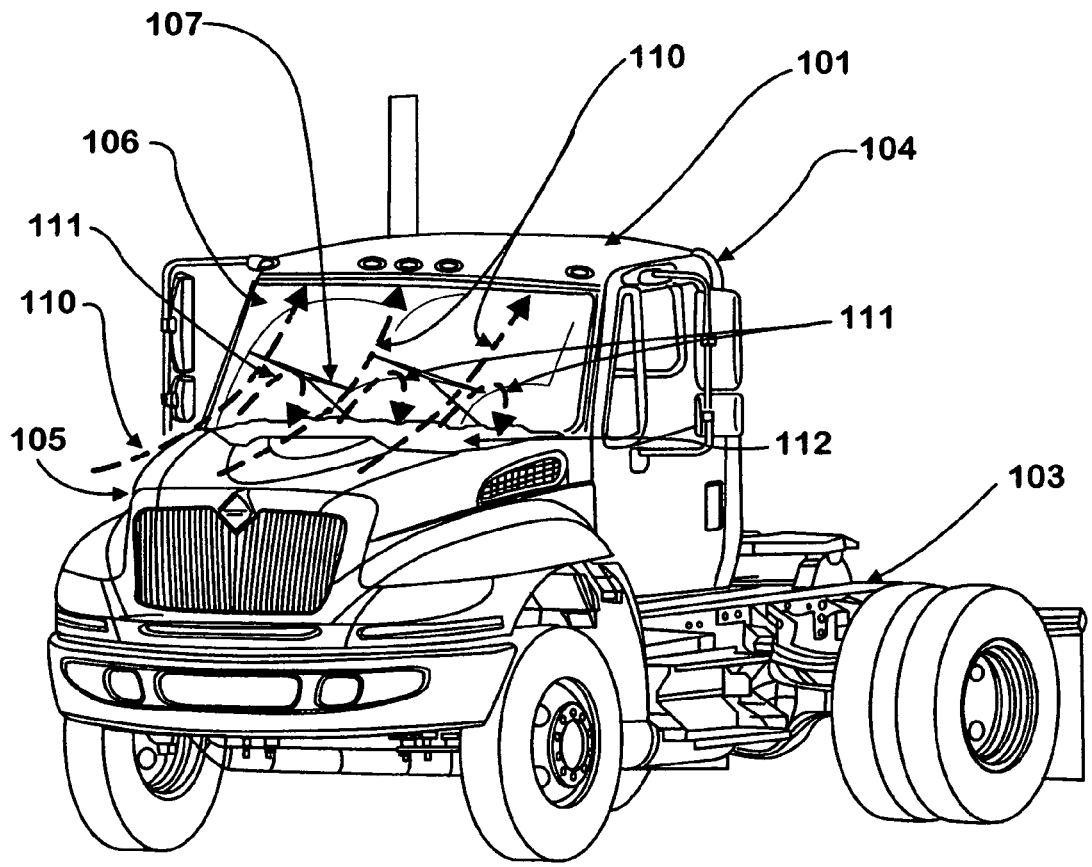
FIG. 3—Vehicle experiencing snow accumulation at base of windshield due to turbulent precipitation.

FIG. 3 shows a vehicle 101 having a chassis 103, a cab 104, a hood 105, and a windshield 106. Air flow 110 relative to the vehicle 101 makes a transition from a direction approximately parallel to the hood 105 of the vehicle 101 to a direction approximately parallel to the windshield 106. The change in direction of the air flow 110 results in a region of air recirculation 111. This region of air recirculation 111 deposits snow and ice 112 near the base of the windshield 106. The location of the snow and ice 112 deposit overlies the cowl tray 109 (not shown) and HVAC intake opening 114 (not shown) as they are shown in FIG. 2. The windshield 106 shown in FIG. 3 is further provided with a set of windshield wipers 107, which windshield wipers 107 tend to push additional snow and ice 112 towards the base of the windshield 106.

Figure 4:
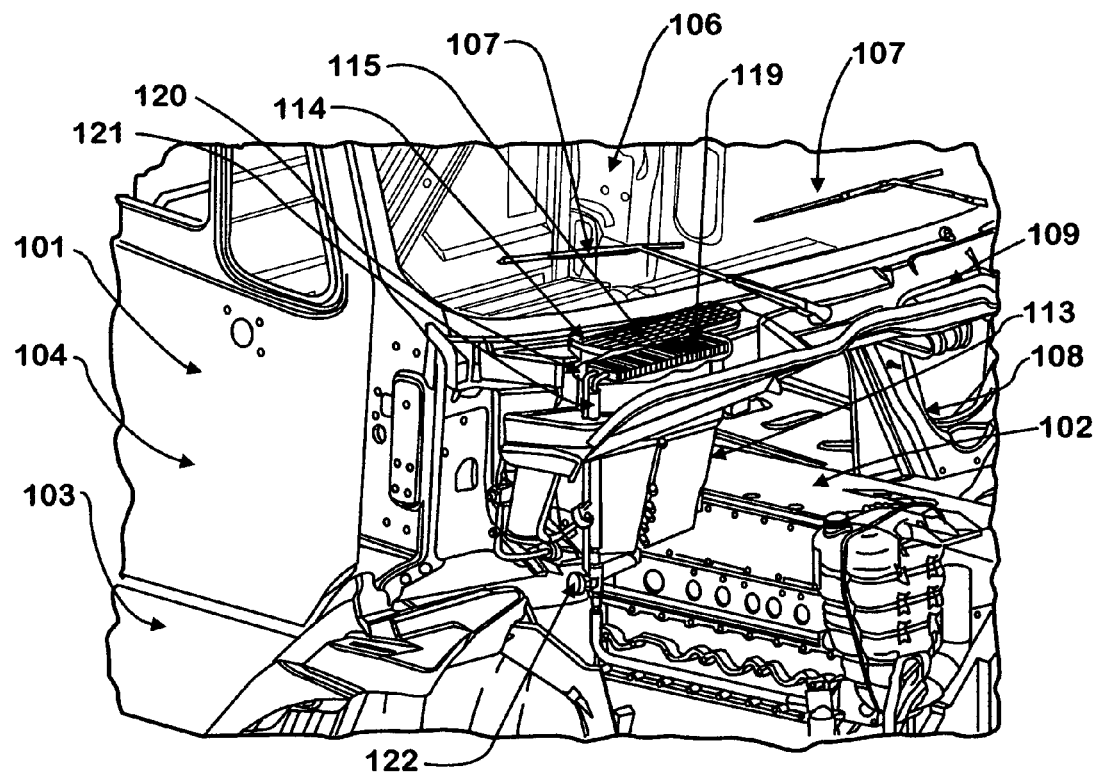
FIG. 4—A view of a first embodiment of the present invention.

FIG. 4 shows a partial view of a vehicle 101 having an engine 102, a chassis 103, and a cab 104, similar to the vehicle 101 shown in FIG. 2. The hood 105 of vehicle 101 is not shown in FIG. 4. The cab 104 of the vehicle 101 shown in FIG. 4 is again provided with a windshield 106, windshield wipers 107, a cowl 108, and a cowl tray 109. An HVAC system 113 connects to the cowl tray 109, passes through the cowl 108, and into the interior of the cab 104, in order to provide heated or cooled air to the occupants thereof. Air enters the HVAC system 113 at the HVAC intake opening 114, which is integrated into the cowl tray 109. The HVAC intake opening 114 is protected against the entry of large debris by means of the HVAC intake screen 115. An embodiment of the present invention, a tube-and-fin type coolant-to-air heat exchanger 119 is located within the HVAC intake opening 114, proximate to the HVAC intake opening 114 and HVAC intake screen 115. The cowl tray 109 is shown partially cut-away, so that the tube-and-fin type coolant-to-air heat exchanger 119 may be more clearly illustrated. Coolant lines 120 carry heated engine coolant from the engine 102 to the tube-and-fin type coolant-to-air heat exchanger 119. In order to increase efficiency, tube insulation 121 may be provided. In the embodiment of the present invention shown in FIG. 4, a manual underhood control valve 122 controls the availability of heated coolant to the tube-and-fin type coolant-to-air heat exchanger 119.

Figure 5:
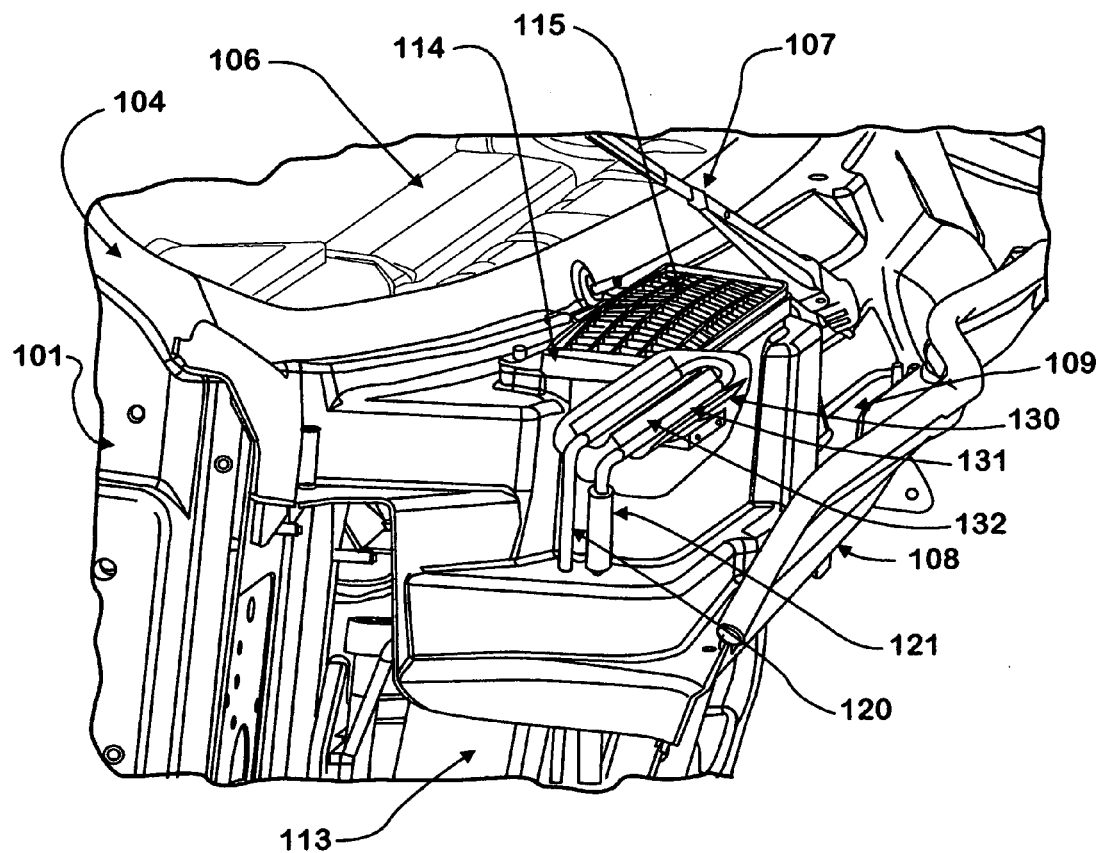
FIG. 5—A view of a second embodiment of the present invention.

FIG. 5 shows a partial view of a vehicle 101 having a cab 104, a windshield 106, windshield wipers 107, a cowl 108, and a cowl tray 109, similar to the vehicle 101 shown in FIG. 4. The hood 105 of vehicle 101 is not shown in FIG. 5. An HVAC system 113 again connects to the cowl tray 109, passes through the cowl 108, and into the interior of the cab 104, in order to provide heated or cooled air to the occupants thereof. Air enters the HVAC system 113 at the HVAC intake opening 114, which is integrated into the cowl tray 109, and is provided with an HVAC intake screen 115. An embodiment of the present invention, a coolant-to-air radiant heat exchanger 130 is located within the HVAC intake opening 114, proximate to the HVAC intake opening 114 and HVAC intake screen 115. The cowl tray 109 is shown partially cut-away, so that the coolant-to-air radiant heat exchanger 130 may be more clearly illustrated. The tubes of the coolant-to-air radiant heat exchanger 130 are coated with a heat emissive coating 131. Radiant heat reflectors 132 attenuate and focus radiant heat produced by the coolant-to-air radiant heat exchanger 130 in the direction of the HVAC intake screen 115. Coolant lines 120 carry heated engine coolant from the engine 102 (not shown) to the coolant-to-air radiant heat exchanger 130. In order to increase efficiency, tube insulation 121 may be provided.

Figure 6:
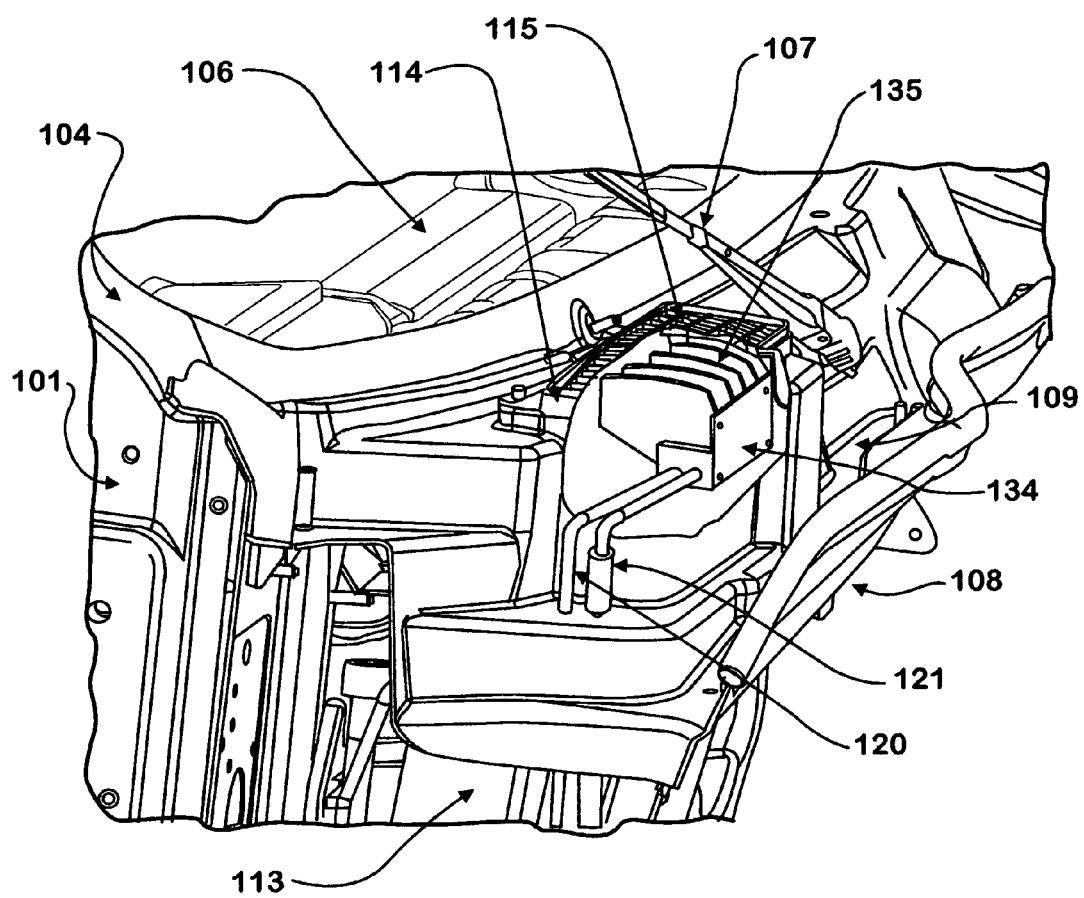
FIG. 6—A view of a third embodiment of the present invention.

FIG. 6 shows a partial view of a vehicle 101 having a cab 104, a windshield 106, windshield wipers 107, a cowl 108, and a cowl tray 109, similar to the vehicles 101 shown in FIG. 4 and FIG. 5. The hood 105 of vehicle 101 is not shown in FIG. 6. An HVAC system 113 connected to the cowl 108 and the cowl tray 109 is again provided having an HVAC intake opening 114 and an HVAC intake screen 115. Another embodiment of the present invention, a conductive heat exchanger 134, is located within the HVAC intake opening 114, and is in communication with the HVAC intake screen 115 by means of a heat conductive structure 135. The heat exchanger 134 and heat conductive structure 135 are constructed of a material having a relatively high coefficient of thermal conductivity, such as aluminum. Again, the cowl tray 109, HVAC intake opening 114, and HVAC intake screen 115 are shown partially cut-away, so that the conductive heat exchanger 134 and heat conductive structure 135 may be more clearly illustrated. Coolant lines 120 carry heated engine coolant from the engine 102 (not shown) to the conductive heat exchanger 134. In order to increase efficiency, tube insulation 121 may be provided.

Figure 7:
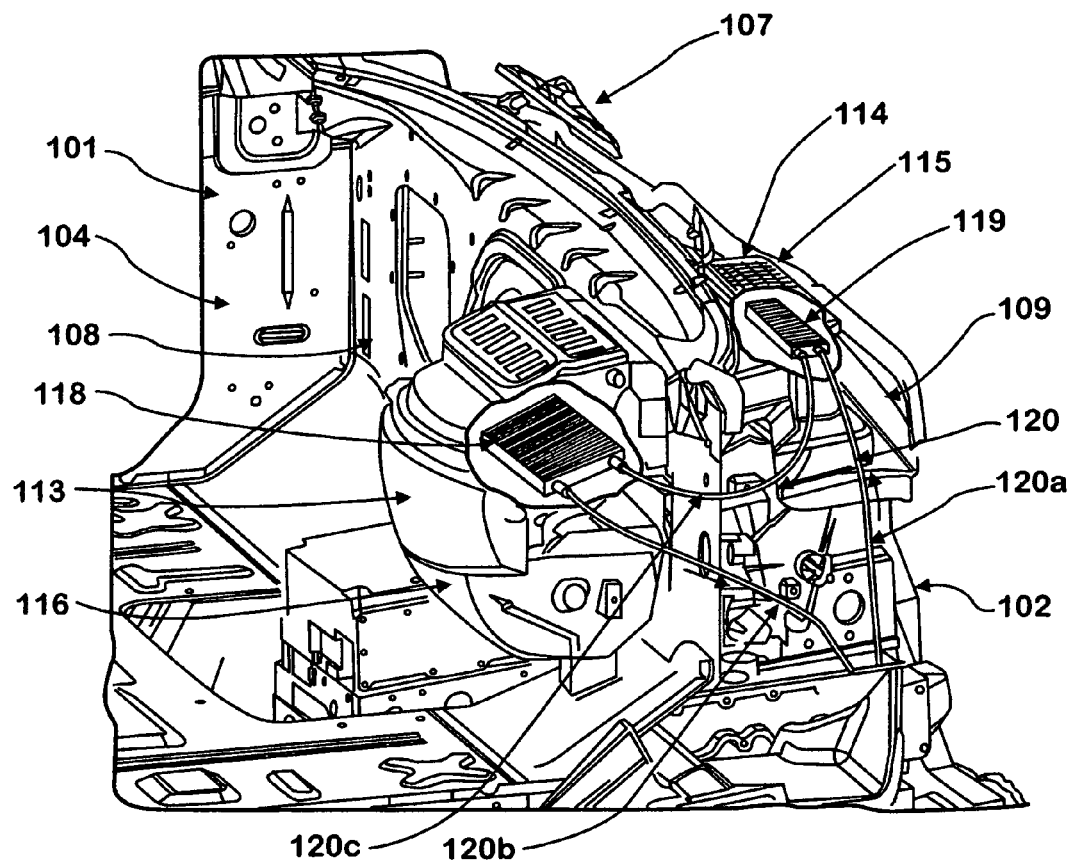
FIG. 7—A view of a fourth embodiment of the present invention.

FIG. 7 shows a partial view of a vehicle 101 having a cab 104, an engine 102, a cowl 108, and a cowl tray 109, similar to the vehicles 101 shown in FIGS. 4-6. The hood 105 of vehicle 101 is not shown in FIG. 7. The cab 104 is shown partially removed for clarity, and in the same way the windshield 106 is not shown, although the windshield wipers 107 are partially shown in the installed position. An HVAC system 113 connected to the cowl 108 and the cowl tray 109 is again provided having an HVAC intake opening 114 and an HVAC intake screen 115. The HVAC system 113 shown in FIG. 7 additionally shows several components interior to the cab 104, specifically an HVAC air distribution plenum 116, which HVAC air distribution plenum 116 is partially cut-away to show an HVAC heater core 118. The HVAC heater core 118 is a type of coolant-to-air heat exchanger well known in the art. An embodiment of the present invention, a tube-and-fin type coolant-to-air heat exchanger 119 is located within the HVAC intake opening 114, proximate to the HVAC intake opening 114 and HVAC intake screen 115. The cowl tray 109 is shown partially cut-away, so that the tube-and-fin type coolant-to-air heat exchanger 119 may be more clearly illustrated. For the sake of illustration, a tube-and-fin type coolant-to-air heat exchanger 119 is shown in FIG. 7, similar to the tube-and-fin type coolant-to-air heat exchanger 119 shown in FIG. 4, although the heat exchanger may also be a coolant-to-air radiant heat exchanger 130 as in FIG. 5, or a conductive heat exchanger 134 as in FIG. 6, as the object of FIG. 7 is to illustrate the coolant routing configuration of the coolant lines 120, independent of the type of HVAC intake heater utilized. The flow of coolant through the tube-and-fin type coolant-to-air heat exchanger 119 and through the HVAC heater core 118 is in series configuration. Specifically, a coolant supply line 120a carries coolant from the engine 102 to the tube-and-fin type coolant-to-air heat exchanger 119, an exchanger to exchanger coolant line 120c carries coolant from the tube-and-fin type coolant-to-air heat exchanger 119 to the HVAC heater core 118, and a coolant return line 120b carries coolant from the HVAC heater core 118 back to the engine 102. Alternately, it is within the scope of the present invention that the flow may be in reverse, so that the coolant passes through the HVAC heater core 118 prior to passing through the tube-and-fin type coolant-to-air heat exchanger 119.

Figure 8:
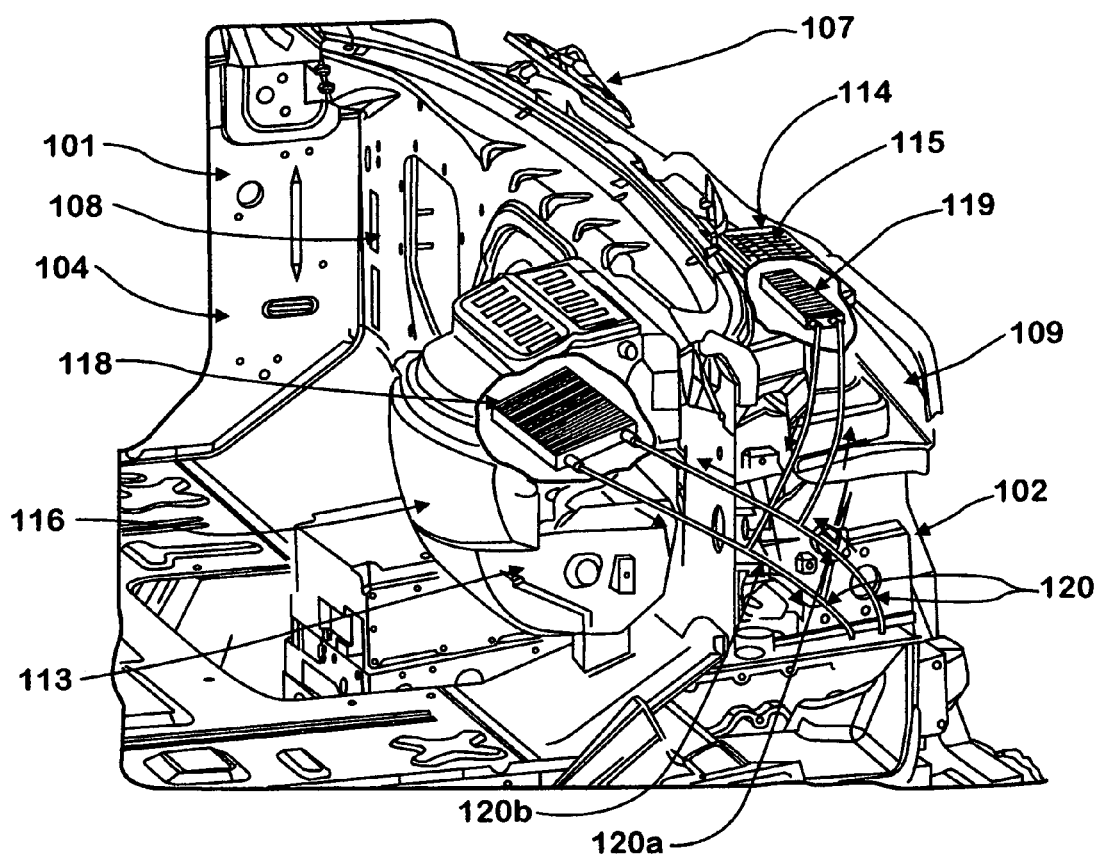
FIG. 8—A view of a fifth embodiment of the present invention.

FIG. 8 shows a partial view of a vehicle 101 having a cab 104, an engine 102, a cowl 108, and a cowl tray 109, similar to the vehicle 101 shown in FIG. 7. The hood 105 of vehicle 101 is not shown in FIG. 8. The cab 104 is again shown partially removed for clarity, with the windshield 106 removed and the windshield wipers 107 partially shown. An HVAC system 113 connected to the cowl 108 and the cowl tray 109 is provided having an HVAC intake opening 114, an HVAC intake screen 115, an HVAC air distribution plenum 116, and an HVAC heater core 118. An embodiment of the present invention, a tube-and-fin type coolant-to-air heat exchanger 119 is located within the HVAC intake opening 114, proximate to the HVAC intake opening 114 and HVAC intake screen 115. Both the HVAC air distribution plenum 116 and the cowl tray 109 are shown partially cut-away, so that the HVAC heater core 118 and the tube-and-fin type coolant-to-air heat exchanger 119 may be more clearly illustrated. In the same manner as in FIG. 7, a tube-and-fin type coolant-to-air heat exchanger 119 is shown in FIG. 8, similar to the tube-and-fin type coolant-to-air heat exchanger 119 shown in FIG. 4, although the heat exchanger may also be a coolant-to-air radiant heat exchanger 130 as in FIG. 5, or a conductive heat exchanger 134 as in FIG. 6, as the object of FIG. 8 is to illustrate the coolant routing configuration of the coolant lines 120, independent of the type of HVAC intake heater utilized. The flow of coolant through the tube-and-fin type coolant-to-air heat exchanger 119 and through the HVAC heater core 118 is in parallel configuration. Specifically, a coolant supply line 120a carries coolant from the engine 102 to the tube-and-fin type coolant-to-air heat exchanger 119, as well as to the HVAC heater core 118. A coolant return line 120b carries coolant from the HVAC heater core 118 and from the tube-and-fin type coolant-to-air heat exchanger 119 back to the engine 102.

Figure 9:
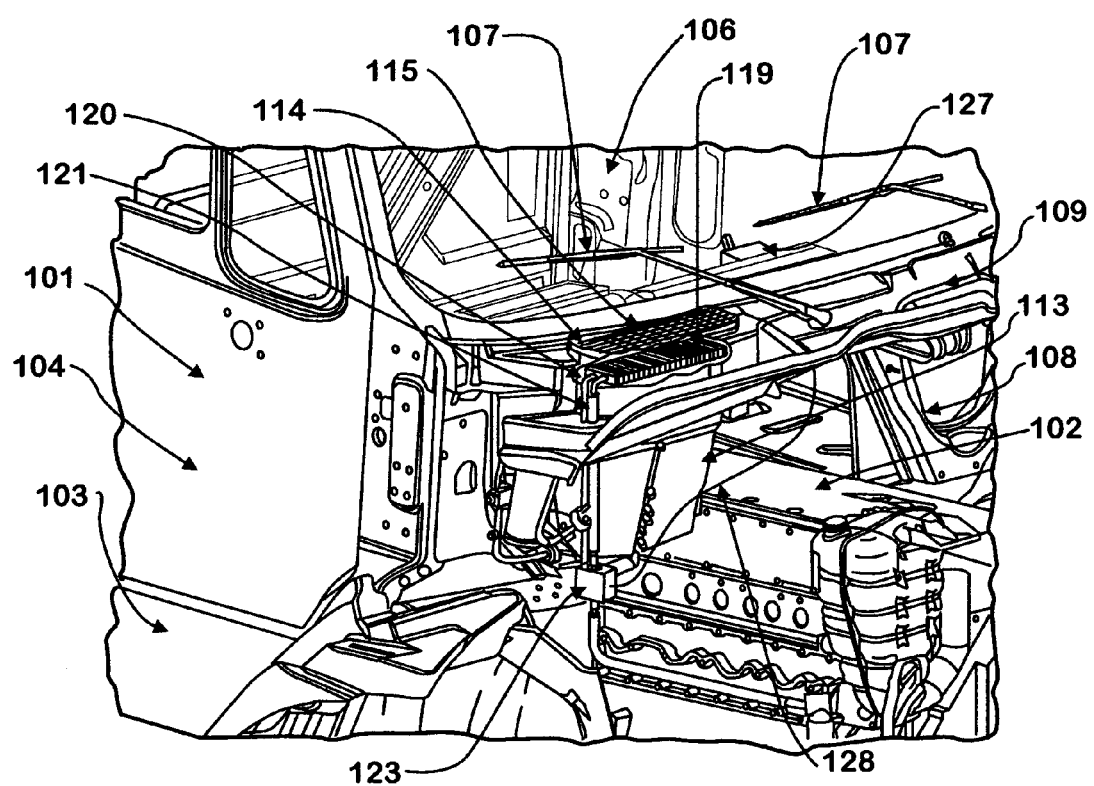
FIG. 9—A view of a sixth embodiment of the present invention.

FIG. 9 shows a partial view of a vehicle 101 having an engine 102, a chassis 103, a cab 104, a windshield 106, windshield wipers 107, a cowl 108, and a cowl tray 109, similar to the vehicle 101 shown in FIG. 4. The hood 105 of vehicle 101 is not shown in FIG. 9. An HVAC system 113 connected to the cowl 108 and the cowl tray 109 is provided having an HVAC intake opening 114 and an HVAC intake screen 115. An embodiment of the present invention, a tube-and-fin type coolant-to-air heat exchanger 119 is located within the HVAC intake opening 114, proximate to the HVAC intake opening 114 and HVAC intake screen 115. The cowl tray 109 is shown partially cut-away, so that the tube-and-fin type coolant-to-air heat exchanger 119 may be more clearly illustrated. Coolant lines 120 carry heated engine coolant from the engine 102 to the tube-and-fin type coolant-to-air heat exchanger 119. In order to increase efficiency, tube insulation 121 may be provided. In the embodiment of the present invention shown in FIG. 9, a remotely controlled valve 123 controls the availability of heated coolant to the tube-and-fin type coolant-to-air heat exchanger 119. The remotely controlled valve 123 is connected to an in-cab control 127 by a valve control line 128, which valve control line 128 may be a vacuum line, an air pressure line, an electrical conductor, or a Bowden cable. The remotely controlled valve 123 itself, then, may be pressure actuated, vacuum actuated, electrically actuated, or cable actuated. The remotely controlled valve 123 of the type shown in FIG. 9 may also be used with a coolant-to-air radiant heat exchanger 130 (not shown) or a conductive heat exchanger 134 (not shown).

Figure 10:
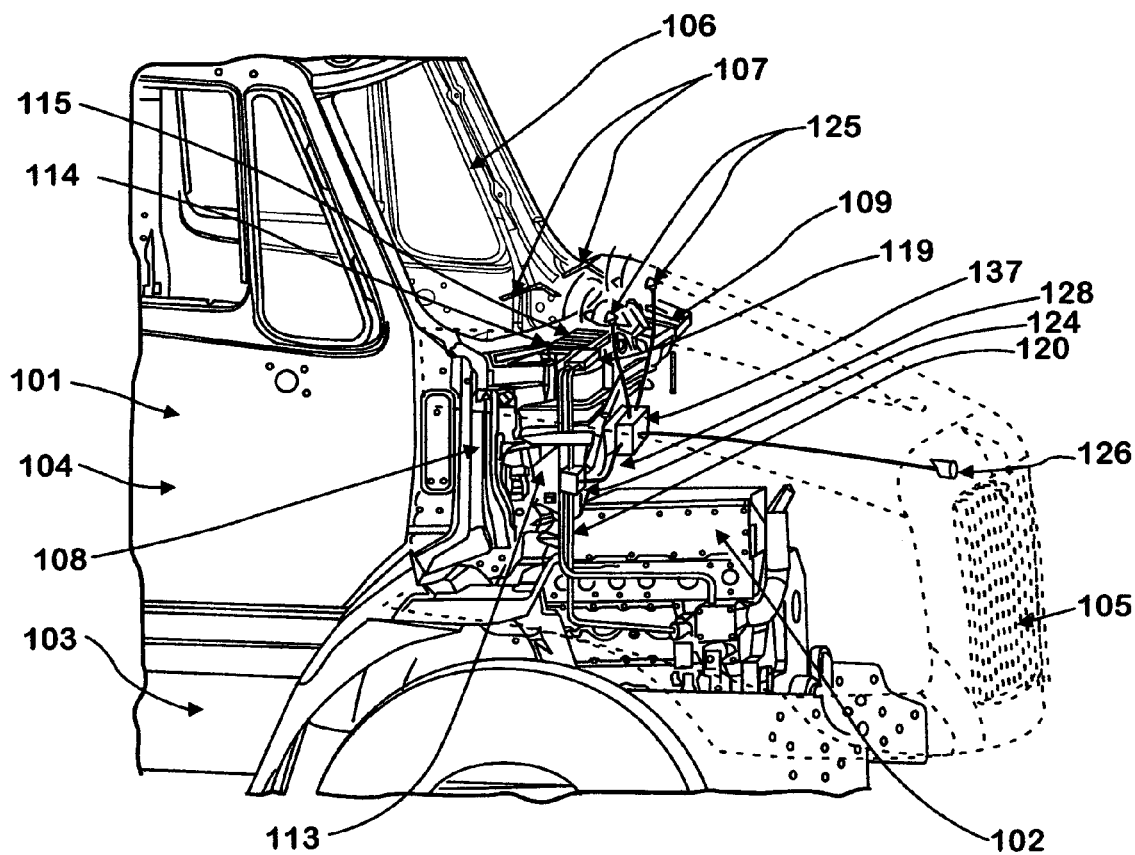
FIG. 10—A view of a seventh embodiment of the present invention.

FIG. 10 shows a partial view of a vehicle 101 having an engine 102, a chassis 103, a cab 104, a windshield 106, windshield wipers 107, a cowl 108, and a cowl tray 109, similar to the vehicle 101 shown in FIG. 4. The hood 105 of vehicle 101 is shown in dotted lines in FIG. 10, so that the underhood components may be illustrated. An HVAC system 113 connected to the cowl 108 and the cowl tray 109 is provided having an HVAC intake opening 114 and an HVAC intake screen 115. An embodiment of the present invention, a tube-and-fin type coolant-to-air heat exchanger 119 is located within the HVAC intake opening 114, proximate to the HVAC intake opening 114 and HVAC intake screen 115. The cowl tray 109 is shown partially cut-away, so that the tube-and-fin type coolant-to-air heat exchanger 119 may be more clearly illustrated. Coolant lines 120 carry heated engine coolant from the engine 102 to the tube-and-fin type coolant-to-air heat exchanger 119. In the embodiment of the present invention shown in FIG. 10, an automatically controlled valve 124 controls the availability of heated coolant to the tube-and-fin type coolant-to-air heat exchanger 119. Snow and ice sensors 125 detect the presence of snow or ice near the base of the windshield 106. One or more ambient conditions sensors 126 may sense the ambient conditions surrounding the vehicle 101, in order to determine if conditions are favorable for the formation of snow and ice. The snow and ice sensors 125 and the ambient conditions sensors 126 are connected to a controller 137, which controller 137 is connected to the automatically controlled valve 124 by the valve control line 128. Alternately, the controller 137 may be entirely integrated into the automatically controlled valve 124. If the snow and ice sensors 125 or the ambient conditions sensors 126 detect the presence of, or conditions favorable for the presence of, an accumulation of snow or ice, the automatically controlled valve 124 is directed by the controller 137 to provide heated coolant to the tube-and-fin type coolant-to air heat exchanger 119, in order to prevent accumulation of snow and ice within and upon the HVAC intake opening 114 and HVAC intake screen 115. The valve control line 128 may be a vacuum line, an air pressure line, or an electrical conductor. The automatically controlled valve 124 itself, then, may be pressure actuated, vacuum actuated, or electrically actuated. The automatically controlled valve 124 of the type shown in FIG. 10 may also be used with a coolant-to-air radiant heat exchanger 130 (not shown) or a conductive heat exchanger 134 (not shown).

Figure 11:
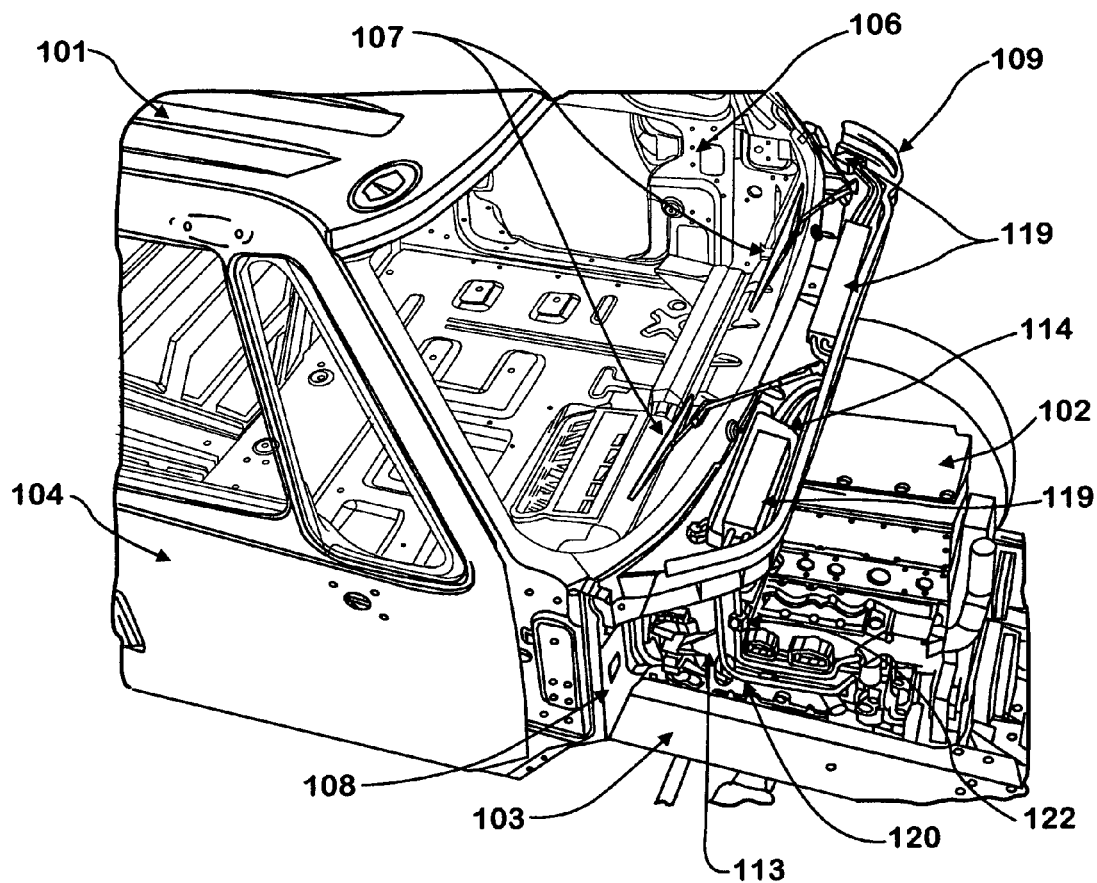
FIG. 11—A view of an eighth embodiment of the present invention.

FIG. 11 shows a partial view of a vehicle 101 having an engine 102, a chassis 103, and a cab 104, similar to the vehicle 101 shown in FIG. 2. The hood 105 of vehicle 101 is not shown in FIG. 11. The cab 104 of the vehicle 101 shown in FIG. 11 is again provided with a windshield 106, windshield wipers 107, a cowl 108, and a cowl tray 109. An HVAC system 113 connects to the cowl tray 109, passes through the cowl 108, and into the interior of the cab 104, in order to provide heated or cooled air to the occupants thereof. Air enters the HVAC system 113 at the HVAC intake opening 114, which is integrated into the cowl tray 109. An embodiment of the present invention, a tube-and-fin type coolant-to-air heat exchanger 119 is located within the HVAC intake opening 114, proximate to the HVAC intake opening 114. The HVAC intake screen 115, which protects the HVAC intake opening 114 against the entry of large debris, is not shown, so that the tube-and-fin type coolant-to-air heat exchanger 119 may be shown more clearly. Additional tube-and-fin type coolant-to-air heat exchangers 119 are attached to the cowl tray 109 along its length, proximate to the base of the windshield 106. For the sake of illustration, tube-and-fin type coolant-to-air heat exchangers 119 are shown in FIG. 11, although the coolant-to-air heat exchangers may also be coolant-to-air radiant heat exchangers 130 as in FIG. 5, conductive heat exchangers 134 as in FIG. 6, or a combination of tube-and-fin type coolant-to-air heat exchangers 119, coolant-to-air radiant heat exchangers 130, and conductive heat exchangers 134, as the object of FIG. 11 is to illustrate the use of multiple coolant-to-air heat exchangers within the HVAC intake opening 114 and attached to the cowl tray 109 along its length. Coolant lines 120 carry heated engine coolant from the engine 102 to the tube-and-fin type coolant-to-air heat exchangers 119. A manual underhood control valve 122 is shown in FIG. 11 controlling the availability of heated coolant to the tube-and-fin type coolant-to-air heat exchangers 119, although a remotely controlled valve 123 as in FIG. 9, or an automatically controlled valve 124 as in FIG. 10 may be used.

Other permutations of the invention are possible without departing from the teachings disclosed herein, provided that the function of the invention is to use a coolant to air heat exchanger to prevent accumulation of snow and ice in and upon an HVAC intake located externally to a vehicle in a location prone to snow and ice accumulation. Other advantages to a vehicle equipped with a coolant to air heat exchanger within an HVAC intake located externally to a vehicle may also be inherent in the invention, without having been described above.

We claim:

1. A vehicle for operation on the ground, comprising:
    an engine, said engine being cooled by liquid coolant;
    an occupant cabin having a cowl and a windshield, said windshield having a base proximate to said cowl, to which cowl said windshield adjoins, said cowl being provided with a cowl tray, said cowl tray being attached to said cowl proximate to said base of said windshield;
    an HVAC system having a primary heater core located within said occupant cabin, said HVAC system further having a vertically oriented HVAC air intake passage external to said occupant cabin, said vertically oriented HVAC air intake passage having an HVAC air intake opening external to said occupant cabin, said HVAC air intake opening being integrated into said cowl tray proximate to and forward of said base of said windshield;
    a coolant-to-air heat exchanger located within said vertically oriented HVAC air intake passage proximate to said HVAC air intake opening; and
    at least one coolant tube in fluid communication with said coolant-to-air heat exchanger and said engine.

2. The vehicle for operation on the ground of claim 1, wherein:
    said HVAC air intake opening is located adjacent to a region of air recirculation, said region of air recirculation being characterized by the accumulation of snow and ice therein.

3. The vehicle for operation on the ground of claim 1, wherein:
    said coolant-to-air heat exchanger further comprises a tube-and-fin type coolant-to-air heat exchanger.

4. The vehicle for operation on the ground of claim 1, wherein:
    said at least one coolant tube is further provided with a manual control valve.

* * * * *